US012681832B2

(12) United States Patent
Haynie et al.

(10) Patent No.: US 12,681,832 B2

(45) Date of Patent: Jul. 14, 2026

(54) HARDWARE-BASED TRACE ASSIST UNIT

(71) Applicant: International Business Machines Corporation, Armonk, NY (US)

(72) Inventors: Howard Michael Haynie, Wappingers Falls, NY (US); Raymond Wong, Hopewell Junction, NY (US); Deepankar Bhattacharjee, Bangalore (IN); Michael James Becht, Poughkeepsie, NY (US); Luke Hopkins, Peterborough, NH (US); Subhasis Samanta, Bengaluru (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 473 days.

(21) Appl. No.: 18/361,565

(22) Filed: Jul. 28, 2023

(65) Prior Publication Data

US 2025/0036542 A1 Jan. 30, 2025

(51) Int. Cl.
*G06F 11/34* (2006.01)

(52) U.S. Cl.
CPC ................................. *G06F 11/348* (2013.01)

(58) Field of Classification Search
CPC ... G06F 11/0778; G06F 11/3466–3495; G06F 11/3636; G06F 11/364
USPC .......................................................... 714/45
See application file for complete search history.

(56) References Cited

U.S. PATENT DOCUMENTS

| | | | |
|---|---|---|---|
| 7,475,291 B2 * | 1/2009 | Cardinell | G06F 11/348 |
| | | | 714/45 |
| 8,719,641 B2 * | 5/2014 | Cole | G06F 11/0781 |
| | | | 714/45 |
| 10,802,947 B2 * | 10/2020 | Chakra | G06F 11/3476 |
| 2007/0220361 A1 * | 9/2007 | Barnum | G06F 11/3636 |
| | | | 714/45 |
| 2009/0113398 A1 | 4/2009 | Birkill et al. | |

(Continued)

OTHER PUBLICATIONS

International Searching Authority, Notification of Transmittal of the International Search Report and the Written Opinion of the International Searching Authority, Nov. 13, 2024, 12 pages, International Application No. PCT/EP2024/069213.

(Continued)

*Primary Examiner* — Joseph R Kudirka

(74) *Attorney, Agent, or Firm* — Teddi Maranzano, Esq.; Kevin P. Radigan, Esq.; Heslin Rothenberg Farley & Mesiti P.C.

(57) ABSTRACT

A trace assist unit operable with a plurality of processor cores is described. The trace assist unit comprises a plurality of physical buffers, and loading circuitry and unloading circuitry that are communicatively coupled with the plurality of physical buffers. The loading circuitry receives trace events from various ones of the plurality of processor cores, each of the trace events having a respective category from a plurality of predefined categories. The loading circuitry writes the trace events to respective ones of the plurality of physical buffers that are assigned to the respective categories of the plurality of predefined categories. The loading circuitry transmits, responsive to one or more predefined conditions, an unload signal to the unloading circuitry to unload contents of a selected physical buffer of the plurality of physical buffers to an external memory.

19 Claims, 5 Drawing Sheets

(56)  References Cited

U.S. PATENT DOCUMENTS

| | | |
|---|---|---|
| 2014/0052930 A1 | 2/2014 | Gulati et al. |
| 2014/0068346 A1 | 3/2014 | Scott et al. |
| 2018/0004628 A1 | 1/2018 | Strong et al. |
| 2021/0303443 A1* | 9/2021 | McConnell ............. G06F 21/46 |

OTHER PUBLICATIONS

Jack Henschel, "Bachelor Thesis: Intel PT Hooking," FAU, Dated: Nov. 5, 2018, pp. 1-42.
"Training Intel® Processor Tracing," Lauterbach, Dated: Feb. 2023, pp. 1-121.
Denis Bakhvalov, "Enhance Performance Analysis with Intel Processor Trace," Perf-Ninja, Dated: Aug. 23, 2019, pp. 1-9.

* cited by examiner

HARDWARE-BASED TRACE ASSIST UNIT

BACKGROUND

The present disclosure relates to computing systems, and more specifically, to a hardware-based trace assist unit for processing trace events received from a plurality of processor cores.

Processor tracing is used to analyze processor performance during program execution, in many cases without requiring interruption of the program execution. Processor tracing generally records the program execution by encoding packets that are highly compressed, e.g., recording which path is selected at each branch instruction that is encountered. For example, for a simple conditional jump instruction, the trace may include in a single bit whether the branch was taken or not taken. Timing information (e.g., a timestamp) may also be recorded with the processor tracing. During later analysis, the execution of the program may be reconstructed using the combination of the application binary file and the processor tracing.

Even considering the compressed format of the traces, a processor can generate a significant amount of trace data during program execution, e.g., on the order of tens or hundreds of megabytes (MB) or more per second of program execution. Further, modern computing systems routinely employ multiple processors, which increases the amount of generated trace data exponentially.

SUMMARY

According to one embodiment of the disclosure, a trace assist unit is disclosed that is operable with a plurality of processor cores. The trace assist unit comprises a plurality of physical buffers, and loading circuitry and unloading circuitry that are communicatively coupled with the plurality of physical buffers. The loading circuitry is to receive trace events from various ones of the plurality of processor cores. Each of the trace events has a respective category from a plurality of predefined categories. The loading circuitry is further to write the trace events to respective ones of the plurality of physical buffers that are assigned to the respective categories of the plurality of predefined categories. The loading circuitry is further to transmit, responsive to one or more predefined conditions, an unload signal to the unloading circuitry to unload contents of a selected physical buffer of the plurality of physical buffers to an external memory.

According to another embodiment, a method is disclosed of operating a hardware-based trace assist unit (TAU). The method comprises receiving, using loading circuitry of the TAU, a trace event from one of a plurality of processor cores. The trace event has a category from a plurality of predefined categories. The method further comprises determining, using the loading circuitry, whether any of a plurality of physical buffers of the TAU are assigned to the category of the trace event. The method further comprises writing the trace event to a first physical buffer, of the plurality of physical buffers, that is assigned to the category. The method further comprises transmitting, responsive to one or more predefined conditions, an unload signal to unloading circuitry of the TAU to unload contents of the first physical buffer to an external memory.

According to another embodiment, a computing system comprises a plurality of processor cores, a cache, and a trace assist unit to receive trace events from various ones of the plurality of processor cores. Each of the trace events has a respective category from a plurality of predefined categories. The trace assist unit is further to write the trace events to respective ones of a plurality of physical buffers of the trace assist unit. The plurality of physical buffers are assigned to the respective categories of the plurality of predefined categories. The trace assist unit is further to unload, responsive to one or more predefined conditions, contents of a selected physical buffer of the plurality of physical buffers to the cache.

DETAILED DESCRIPTION

Figure 1:
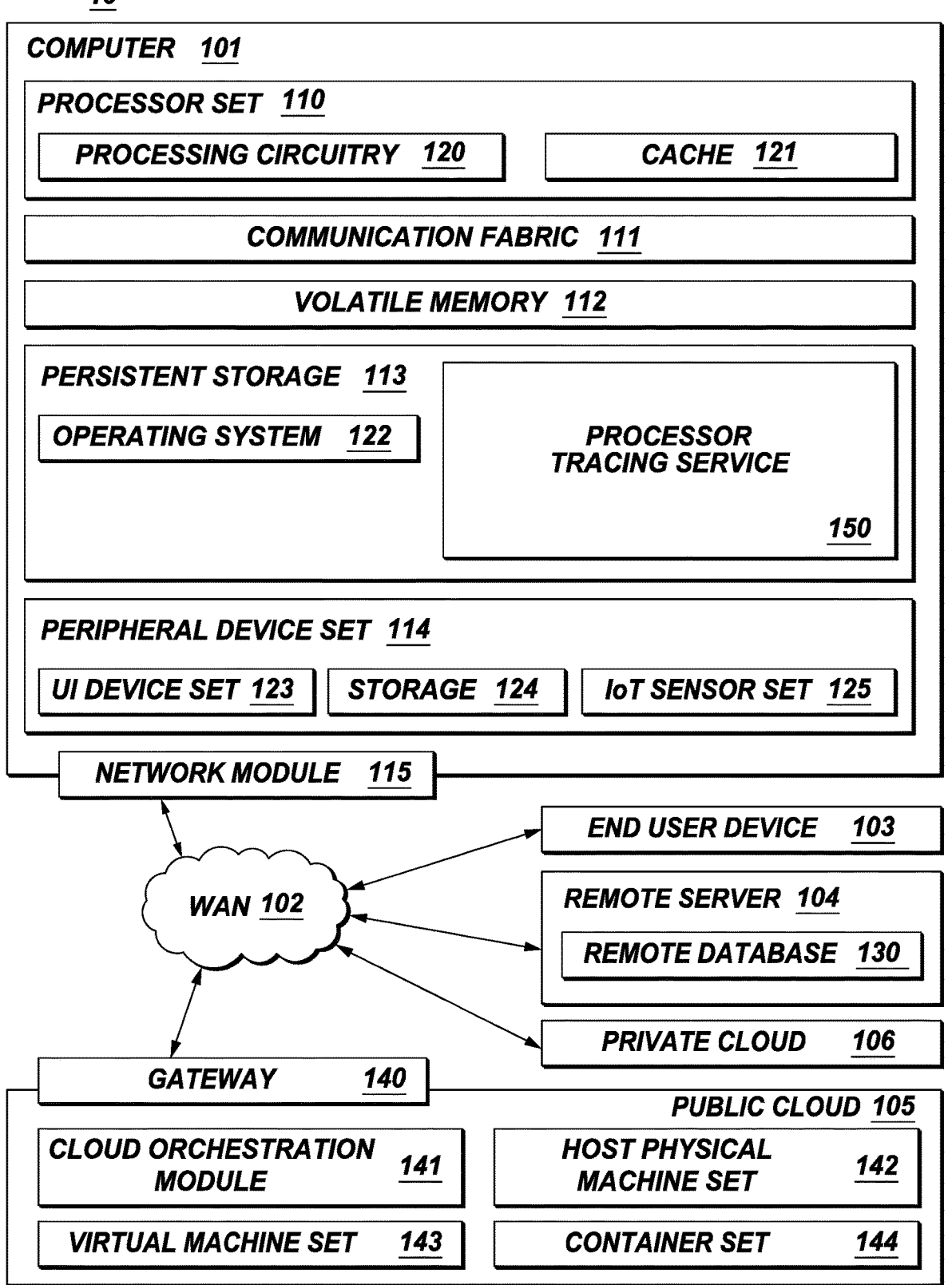
FIG. 1 is a diagram of an exemplary computing environment, according to one or more embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a processor tracing service 150 capable of receiving trace events and reconstructing program execution. In addition to the processor tracing service 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the processor tracing service 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the processor tracing service 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in the processor tracing service 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
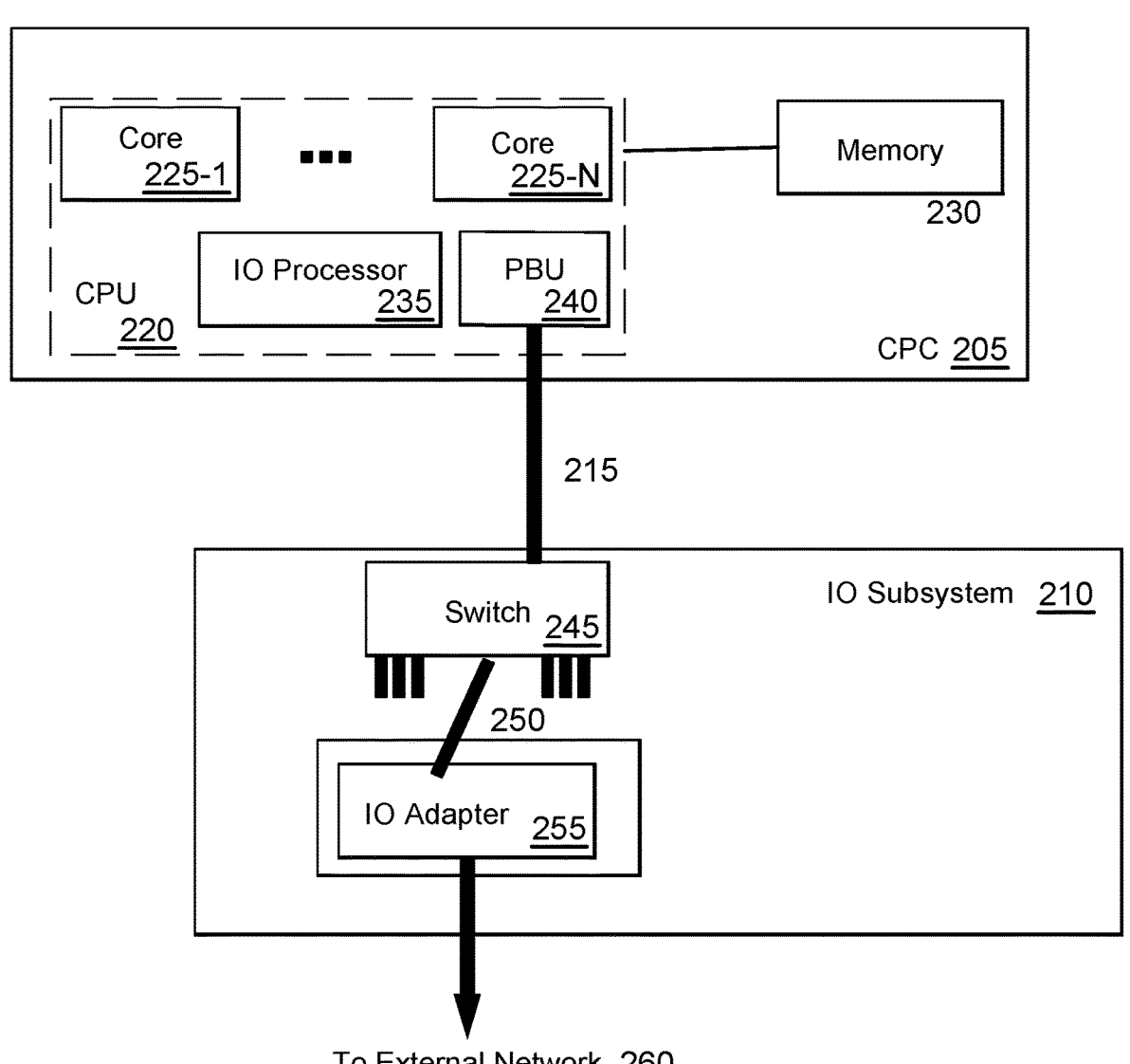
FIG. 2 is a diagram of an exemplary computing system, according to one or more embodiments.

FIG. 2 is a diagram of an exemplary computing system 200, according to one or more embodiments. The features described with respect to the computing system 200 may be used in conjunction with other embodiments described herein. For example, the computing system 200 may represent one example implementation of the computer 101 of FIG. 1. In some embodiments, the computing system 200 may be implemented as a mainframe computer. However, other implementations of the computing system 200 are also contemplated.

The computing system 200 comprises a central processing complex (CPC) 205 that is communicatively coupled with an input/output (IO) subsystem 210. The CPC 205 comprises a central processing unit (CPU) 220 and a memory 230, which may include volatile memory and/or persistent storage. The CPU 220 comprises a plurality of processor cores 225-1, . . . , 225-N having any suitable implementation.

The CPU 220 further comprises an IO processor 235 that is communicatively coupled with the plurality of processor cores 225-1, . . . , 225-N. In some embodiments, the CPU 220 further comprises a PCIe bridge unit (PBU) 240 that is communicatively coupled with the IO processor 235 and with the IO subsystem 210. The IO processor 235 comprises a trace assist unit that is communicatively coupled with the plurality of processor cores 225-1, . . . , 225-N and receives and processes trace events therefrom. The trace assist unit is described in greater detail below with respect to FIGS. 3, 4, and 5. While the various components are described as being included in the CPU 220, alternate embodiments may have different arrangements of the components within the CPC 205. For example, the IO processor 235 may be implemented separate from the CPU 220 in one alternate implementation.

The IO subsystem 210 comprises a switch 245 that is communicatively coupled to the PBU 240 via communication links 215, and with a plurality of IO adapters 255 of the IO subsystem 210 via communication links 250. The communication links 215, 250 are implemented using a plurality of conductors in any suitable form (e.g., conductive traces or wires). In one non-limiting example, the communication links 215, 250 each comprise an 8-lane PCIe connection, where each of the lanes comprises a respective two conductors. Other configurations of the communications links 215, 250, which may include the use of different protocols, are also contemplated. The plurality of IO adapters 255 connect the computing system 200 to an external network 260, e.g., a storage area network (SAN) having one or more storage devices, using any suitable technology such as Ethernet.

The computing system 200 (more specifically, the IO processor 235) defines a plurality of channels (or communication paths) between the CPC 205 and various devices of the external network 260. Each channel is assigned a distinct channel path identifier (CHPID), which may represent both a physical channel port location (PCHID) and a logical channel subsystem. In some embodiments, the channels established by the IO processor 235 are virtualized, so that any operating system instance executing on one of the processor cores 225-1, . . . , 225-N is able to access any channel.

The architecture of the computing system 200, and more specifically the use of the IO processor 235 within the CPC 205, provides a number of benefits. In general terms, the computing system 200 provides a more efficient operation reflecting updates to the architecture of the CPC 205. First, providing the IO processor 235 within the CPC 205 shortens a path length from the processor cores 225-1, . . . , 225-N to the IO functionality, supporting greater throughput and responsiveness. The IO processor 235 may be reconfigured and therefore adaptable to new types of communication links used by the IO subsystem 210. Further, use of the IO processor 235 allows new types of IO adapters 255 to be integrated into the computing system 200 without requiring development of custom interface hardware in the IO subsystem 210 (e.g., implementing using a unique ASIC and IO card). In this way, the overall cost of the computing system 200 and/or its power consumption may be reduced.

Figure 3:
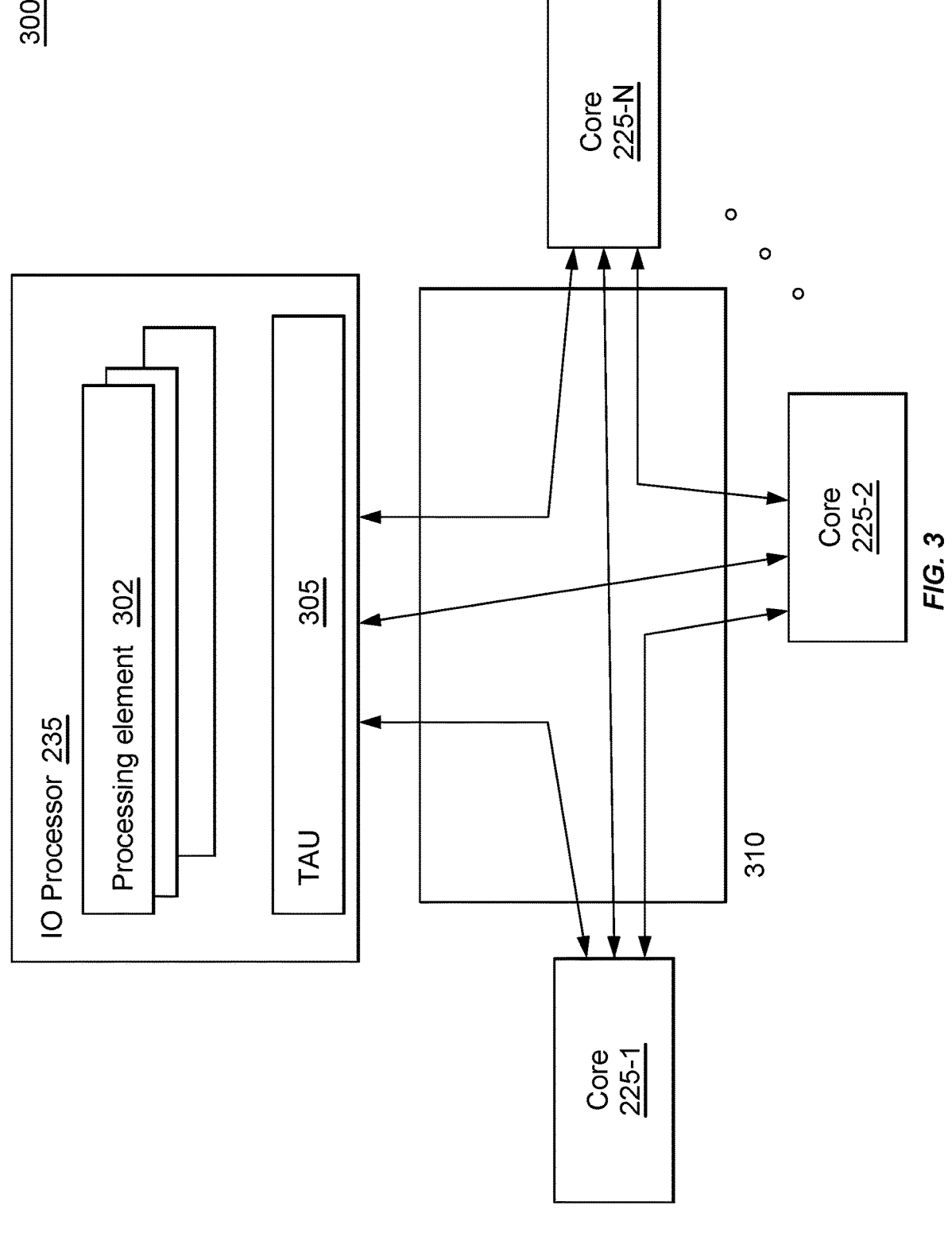
FIG. 3 is a diagram of a communication fabric communicatively coupled with a plurality of processor cores and a trace assist unit, according to one or more embodiments.

Refer now to diagram 300 of FIG. 3, in which the IO processor 235 comprises a plurality of processing elements 302 that provide connectivity for the plurality of channels, as well as implement protocols on the plurality of channels. The plurality of processing elements 302 may have any suitable implementation. In one non-limiting example, the plurality of processing elements 302 implement the RISC-V instruction set architecture, which allows the plurality of processing elements 302 to be dynamically updated to support new features and/or functions, as well as to provide functionality beyond the operations discussed above.

The IO processor 235 is communicatively coupled with the plurality of processor cores 225-1, 225-2, . . . , 225-N through a communication fabric 310. Generally, the communication fabric 310 comprises components and logic that support dynamic formation of interconnections between the various nodes connected to the communication fabric 310. In the example shown in diagram 300, each of the plurality of processor cores 225-1, 225-2, . . . , 225-N is connected with each other through the communication fabric 310, as well as with the IO processor 235.

The IO processor 235 further comprises a trace assist unit (TAU) 305 that receives and processes trace events received from the plurality of processor cores 225-1, 225-2, . . . , 225-N through the communication fabric 310. The trace events generally represent a record of program execution by the plurality of processor cores 225-1, 225-2, . . . , 225-N. The trace events are typically timestamped and may vary in size.

Even with the compressed format of the trace events, the plurality of processor cores 225-1, 225-2, . . . , 225-N generate a large amount of trace data during program execution. According to embodiments described herein, the TAU 305 is capable of managing the large amount of trace data using a plurality of physical buffers. In some embodiments, the plurality of physical buffers are dedicated buffers that are written by the TAU 305 without using cache memory of subsystems of the IO processor 235 or cache memory of subsystems of the processor cores 225-1, . . . , 225-N. In this way, writing the trace events can be performed without requiring coherency handling of the cache lines in the various processor subsystems, which provides improvements through increased speed and/or decreased energy consumption of the CPC 205.

Using one or more levels of categorization for the trace events, the TAU 305 packs those trace events having a same categorization into particular physical buffer(s) that are dynamically assigned to the particular categorization. The plurality of physical buffers may be relatively small in size, as the trace events tend to be received from the plurality of processor cores 225-1, 225-2, . . . , 225-N in bursts. In one non-limiting example, the categorization may include the particular channel on which the trace event was received, and/or a particular class of a plurality of classes within the channel. The trace events packed into the physical buffer are unloaded by the TAU to an external memory (e.g., an external cache of the CPC 205) responsive to one or more predefined conditions, such as the physical buffer being full, no physical buffers being available for storing the received trace event (that is, no physical buffers are assigned to the particular categorization), or the occurrence of an error event requiring the physical buffer to be flushed. In some embodiments, the external cache is backed by a much larger system memory that can allocate multiple gigabytes for storing trace data. The stored trace data may be separately collected and parsed by software that is executed separate from the trace generation and processing functionality.

Figure 4:
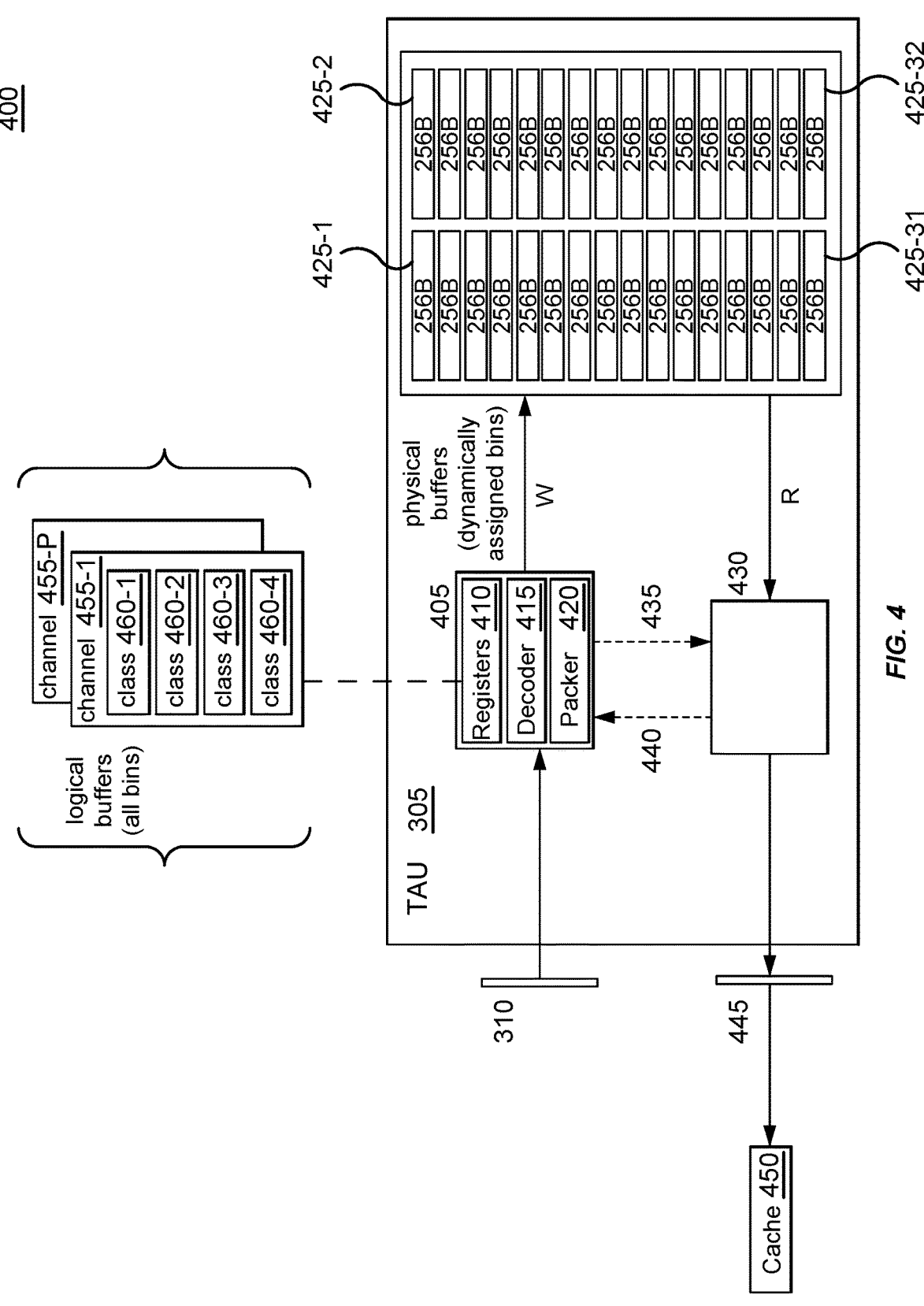
FIG. 4 is a diagram of an exemplary trace assist unit, according to one or more embodiments.

FIG. 4 is a diagram 400 of an exemplary TAU, according to one or more embodiments. The features described with respect to the diagram 400 may be used in conjunction with other embodiments described herein. For example, the diagram 400 represents one example implementation of the TAU 305 of FIG. 3.

The TAU 305 comprises loading circuitry 405, unloading circuitry 430, and a plurality of physical buffers 425-1, 425-2, . . . , 425-31, 425-32. The loading circuitry 405 is communicatively coupled with the plurality of processor cores 225-1, 225-2, . . . , 225-N through the communication fabric 310, and receives trace events therethrough. Although not shown, in some embodiments, the plurality of processing elements 302 of the IO processor 235 may process the trace events from the plurality of processor cores 225-1, 225-2, . . . , 225-N before being received by the loading circuitry 405. For example, the plurality of processing elements 302 may determine a type of the trace events, may perform compression and/or filtering of the trace events, and so forth.

The loading circuitry 405 comprises a plurality of registers 410 storing configuration information for operation of the TAU 305. For example, the plurality of registers 410 may include one or more of the following: (1) one or more registers storing pointer(s) to starting memory location(s) for each category of a plurality of predefined categories, (2) one or more registers storing size(s) of the trace events for each category, (3) one or more registers storing value(s) for each physical port/PCHID (e.g., a respective bit) that will trigger a flush of the physical buffers, value(s) that allow individual traces to be started or stopped (responsive to an error), and/or value(s) that allow individual traces to be disabled, and (4) one or more registers storing pointer(s) to a next memory location to be written to for each category.

In this way, the plurality of registers 410 are used to define a plurality of logical buffers that correspond to the plurality of predefined categories. Using the example of two-level categorization, the plurality of predefined categories include four (4) classes 460-1, 460-2, 460-3, 460-4 within each of a plurality of channels 455-1, . . . , 455-P. In some embodiments, each the plurality of channels 455-1, . . . , 455-P corresponds to a respective port/PCHID, and each of the classes 460-1, 460-2, 460-3, 460-4 corresponds to a respective keyhole address. Thus, the count of the predefined categories may be at least 4P. In some embodiments, the plurality of registers 410 define one or more additional logical buffers to provide administrative functionality for various ones of the plurality of logical buffers.

The loading circuitry 405 further comprises decoder circuitry 415 that receives the trace events and determines, using the trace events and the values stored in the registers 410, whether any of the plurality of physical buffers 425-1, 425-2, . . . , 425-31, 425-32 are assigned to the categories of the plurality of predefined categories. When, for a particular trace event, none of the plurality of physical buffers 425-1, 425-2, . . . , 425-31, 425-32 is available to store the trace event, the decoder circuitry 415 assigns at least one of the plurality of physical buffers 425-1, 425-2, . . . , 425-31, 425-32 to the category. In some cases, the decoder circuitry 415 transmits an unload signal 435 to the unloading circuitry 430 to unload one or more of the physical buffers 425-1, 425-2, . . . , 425-31, 425-32. In some embodiments, the unloading circuitry 430 selects the physical buffer to unload by determining a least recently used (LRU) physical buffer of the plurality of physical buffers 425-1, 425-2, . . . , 425-31, 425-32.

The unloading circuitry 430 reads the contents of the selected physical buffer and transmits the contents to an external cache 450 through an interface 445. Once the selected physical buffer is copied to the external cache 450, the unloading circuitry 430 transmits a clear signal 440 to the loading circuitry 405 to indicate that the selected physical buffer has been freed. The loading circuitry 430 reassigns the unloaded physical buffer to the category responsive to the clear signal 440.

The loading circuitry 405 further comprises packer circuitry 420 that writes the trace event to a first physical buffer the plurality of physical buffers 425-1, 425-2, . . . , 425-31, 425-32 that is assigned to the category. In some embodiments, the packer circuitry 420 inserts information into the trace event (e.g., within a header), such as a timestamp, a sequence number, and/or other identification information. In some embodiments, the loading circuitry 405 uses a pointer, stored in the registers 410, to the starting memory location for the category of the trace event. Should the length of the trace event extend beyond the limit of the first physical buffer, the loading circuitry 405 uses a pointer, stored in the registers 410, to a next memory location to be written to for the category of the trace event.

In some embodiments, each of the plurality of physical buffers 425-1, 425-2, . . . , 425-31, 425-32 has a size corresponding to a cache line of the external cache 450. Beneficially, the sizing allows for a more efficient write to the external cache 450 (e.g., without partial writes of the content of the physical buffer to multiple cache lines of the external cache 450), accomplished in less time and/or consuming less energy.

In some embodiments, the unloading circuitry 430 unloads physical buffers responsive to the loading circuitry 405 detecting one or more predefined conditions. In some embodiments, the one or more predefined conditions includes one or more of the following: a physical buffer of the plurality of physical buffers 425-1, 425-2, . . . , 425-31, 425-32 is full, none of the plurality of physical buffers 425-1, 425-2, . . . , 425-31, 425-32 are unassigned, and an error event has occurred. The one or more predefined conditions may further include an elapse of a predefined period of time, such that the plurality of physical buffers 425-1, 425-2, . . . , 425-31, 425-32 are flushed periodically.

Using the distinct loading circuitry 405 and unloading circuitry 430 of the TAU 305, the processes of unloading physical buffers is handled independently of loading new trace events into available physical buffers, which allows greater responsiveness and throughput of the IO processor 235. Further, by maintaining pointers for each logical buffer using the plurality of registers 410, trace events will be written at a next position in the logical buffer, and maintained even across reassignments of the physical buffers, which reduces the amount of memory required and allows more trace events to be stored.

Figure 5:
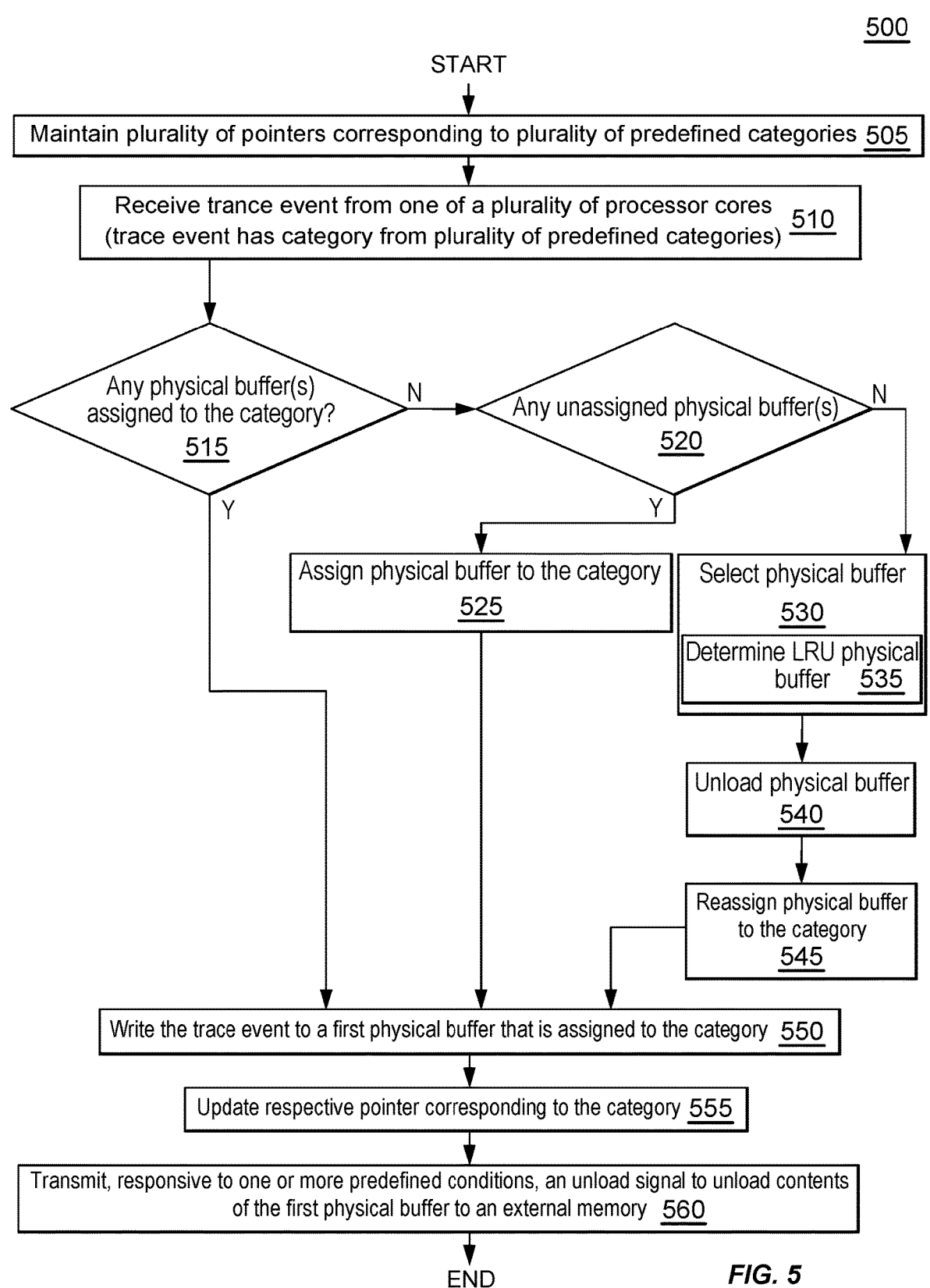
FIG. 5 illustrates an exemplary method of operating a hardware-based trace assist unit, according to one or more embodiments.

FIG. 5 illustrates an exemplary method 500 of operating a hardware-based trace assist unit, according to one or more embodiments. The features described with respect to the method 500 may be used in conjunction with other embodiments described herein. For example, the method 500 may be performed using the TAU 305 of FIGS. 3 and 4. Further, although the various blocks are described as being performed by the TAU 305, other implementations may have blocks performed using different component(s).

The method 500 begins at block 505, where the TAU 305 maintains a plurality of pointers corresponding to a plurality of predefined categories. The predefined categories are used to categorize trace events that are received by the TAU 305. In some embodiments, the predefined categories are arranged in a single level. In other embodiments, the predefined categories are arranged in two or more levels.

At block 510, the TAU 305 receives a trace event from one of a plurality of processor cores. The trace event has a category from the plurality of predefined categories. At block 515, the TAU 305 determines whether any of the plurality of physical buffers are assigned to the category of the trace event. If one or more physical buffers are assigned to the category ("Y"), flow proceeds from block 515 to block 550, where the TAU 305 writes the trace event to a first physical buffer that is assigned to the category.

If no physical buffers are assigned to the category ("N"), flow proceeds from block 515 to block 520, where the TAU 305 determines whether any of the physical buffers are unassigned to a category. If one or more physical buffers are unassigned ("Y"), flow proceeds from block 520 to block 525, where the TAU 305 assigns the physical buffer to the category. Flow then proceeds from block 525 to block 550, where the trace event is written to the assigned physical buffer.

If no physical buffers are unassigned ("N"), flow proceeds from block 520 to block 530, where the TAU 305 selects a physical buffer of the plurality of physical buffers to unload. In some embodiments, selecting the physical buffer is responsive to an unload signal (similar to block 560, discussed below). In some embodiments, selecting the physical buffer comprises (at block 535) determining a least recently used (LRU) physical buffer. Because the trace events tend to be received from the processor cores in bursts, it is likely that the LRU physical buffer will be used more frequently when reassigned to the category, improving system speed and economy of resources.

At block 540, the TAU 305 unloads the physical buffer to an external memory, such as a cache. At block 545, the TAU 305 reassigns the physical buffer to the category. At block 550, the TAU 305 writes the trace event to the reassigned physical buffer. In some embodiments, writing the trace event is responsive to a clear signal. At block 555, the TAU 305 updates the respective pointer corresponding to the category (based on the written trace event, e.g., the length). At block 560, the TAU 305 transmits, responsive to one or more predefined conditions, an unload signal to unload contents of the first physical buffer to an external memory. The method 500 ends following completion of block 560.

While the foregoing is directed to embodiments of the present invention, other and further embodiments of the invention may be devised without departing from the basic scope thereof, and the scope thereof is determined by the claims that follow.

What is claimed is:

1. A trace assist unit operable with a plurality of processor cores, the trace assist unit comprising:
   a plurality of physical buffers; and
   loading circuitry and unloading circuitry that are communicatively coupled with the plurality of physical buffers, the loading circuitry to:
       receive trace events from various ones of the plurality of processor cores, each of the trace events having a respective category from a plurality of predefined categories;
       determine, for one of the trace events, that none of the plurality of physical buffers is assigned to the respective category of the one trace event and dynamically assign one of the plurality of physical buffers to the respective category of the one trace event;
       write the trace events to respective ones of the plurality of physical buffers that are assigned to the respective categories of the plurality of predefined categories; and
       transmit, responsive to one or more predefined conditions, an unload signal to the unloading circuitry to unload contents of a selected physical buffer of the plurality of physical buffers to an external memory.

2. The trace assist unit of claim 1, the loading circuitry further to, for each of the trace events:
   determine whether any of the plurality of physical buffers is assigned to the respective category of that trace event; and
   when none of the plurality of physical buffers is assigned to the respective category, assign one of the plurality of physical buffers to the respective category.

3. The trace assist unit of claim 2,
   wherein the one or more predefined conditions includes a condition that none of the plurality of physical buffers are unassigned,
   wherein assigning one of the plurality of physical buffers to the respective category comprises:

selecting a physical buffer of the plurality of physical buffers to be unloaded, wherein the unload signal indicates the selected physical buffer; and reassigning the selected physical buffer, once unloaded, to the respective category.

4. The trace assist unit of claim 3, wherein selecting a physical buffer of the plurality of physical buffers to be unloaded comprises:

determining a least recently used (LRU) physical buffer of the plurality of physical buffers.

5. The trace assist unit of claim 1, wherein the one or more predefined conditions includes one or more of the following:

a physical buffer of the plurality of physical buffers is full, none of the plurality of physical buffers are unassigned, and an error event has occurred.

6. The trace assist unit of claim 1, the loading circuitry further to:

maintain a plurality of pointers corresponding to the plurality of predefined categories, wherein writing the trace events to respective ones of the plurality of physical buffers comprises, for each of the trace events:

writing that trace event to that respective physical buffer according to a respective pointer of the plurality of pointers that corresponds to the respective category; and updating the respective pointer.

7. The trace assist unit of claim 1, wherein the external memory is a cache, and wherein each of the plurality of physical buffers has a size corresponding to a cache line of the cache.

8. A method of operating a hardware-based trace assist unit (TAU), the method comprising:

receiving, using loading circuitry of the TAU, a trace event from one of a plurality of processor cores, the trace event having a category from a plurality of predefined categories;

determining, using the loading circuitry, whether any of a plurality of physical buffers of the TAU are assigned to the category of the trace event;

when none of the plurality of physical buffers is assigned to the category, assigning one of the plurality of physical buffers to the category;

writing the trace event to a first physical buffer, of the plurality of physical buffers, that is assigned to the category; and transmitting, responsive to one or more predefined conditions, an unload signal to unloading circuitry of the TAU to unload contents of the first physical buffer to an external memory.

9. The method of claim 8, wherein the one or more predefined conditions includes a condition that none of the plurality of physical buffers are unassigned, wherein assigning one of the plurality of physical buffers to the category comprises:

selecting a physical buffer of the plurality of physical buffers to be unloaded, wherein the unload signal indicates the selected physical buffer; and reassigning the selected physical buffer, once unloaded, to the category.

10. The method of claim 9, wherein selecting a physical buffer of the plurality of physical buffers to be unloaded comprises:

determining a least recently used (LRU) physical buffer of the plurality of physical buffers.

11. The method of claim 8, wherein the one or more predefined conditions includes one or more of the following:

a physical buffer of the plurality of physical buffers is full, none of the plurality of physical buffers are unassigned, and an error event has occurred.

12. The method of claim 8, further comprising:

maintaining a plurality of pointers corresponding to the plurality of predefined categories, wherein writing the trace event to the first physical buffer is according to a respective pointer of the plurality of pointers that corresponds to the category; and updating the respective pointer.

13. The method of claim 8, wherein the external memory is a cache, and wherein each of the plurality of physical buffers has a size corresponding to a cache line of the cache.

14. A computing system comprising:

a plurality of processor cores;

a cache; and a trace assist unit operable with the plurality of processor cores and comprising a plurality of physical buffers and loading circuitry and unloading circuitry that are communicatively coupled with the plurality of physical buffers, the trace assist unit to:

receive trace events from various ones of the plurality of processor cores, each of the trace events having a respective category from a plurality of predefined categories;

determine, for one of the trace events, that none of the plurality of physical buffers is assigned to the respective category of the one trace event and dynamically assign one of the plurality of physical buffers to the respective category of the one trace event;

write the trace events to respective ones of a plurality of physical buffers of the trace assist unit, wherein the plurality of physical buffers are assigned to the respective categories of the plurality of predefined categories; and unload, responsive to one or more predefined conditions, contents of a selected physical buffer of the plurality of physical buffers to the cache.

15. The computing system of claim 14, the trace assist unit further to, for each of the trace events:

determine whether any of the plurality of physical buffers is assigned to the respective category of that trace event; and when none of the plurality of physical buffers is assigned to the respective category, assign one of the plurality of physical buffers to the respective category.

16. The computing system of claim 15, wherein the one or more predefined conditions includes a condition that none of the plurality of physical buffers are unassigned, wherein assigning one of the plurality of physical buffers to the respective category comprises:

selecting a physical buffer of the plurality of physical buffers to be unloaded; and reassigning the selected physical buffer, once unloaded, to the respective category.

17. The computing system of claim 16, wherein selecting a physical buffer of the plurality of physical buffers to be unloaded comprises:

determining a least recently used (LRU) physical buffer of the plurality of physical buffers.

18. The computing system of claim 14, the trace assist unit further to:

maintain a plurality of pointers corresponding to the plurality of predefined categories, wherein writing the trace events to respective ones of the plurality of physical buffers comprises, for each of the trace events:

writing that trace event to that respective physical buffer according to a respective pointer of the plurality of pointers that corresponds to the respective category; and updating the respective pointer.

19. The computing system of claim 14, further comprising:

a central processing complex comprising the plurality of processor cores, the cache, and the trace assist unit, the plurality of processor cores communicatively coupled with each other, and with the trace assist unit, by a communication fabric; and an input/output subsystem communicatively coupled with the central processing complex, the input/output subsystem comprising a plurality of input/output adapters to connect to an external network.

* * * * *